US011643203B2

United States Patent
Lee (10) Patent No.: US 11,643,203 B2
(45) Date of Patent: May 9, 2023

(54) UNMANNED AERIAL VEHICLE WITH PACKAGE CARRIER

(71) Applicant: RAKUTEN GROUP, INC., Tokyo (JP)

(72) Inventor: Kenichi Lee, Tokyo (JP)

(73) Assignee: RAKUTEN GROUP, INC., Tokyo (JP)

( * ) Notice: Subject to any disclaimer, the term of this patent is extended or adjusted under 35 U.S.C. 154(b) by 481 days.

(21) Appl. No.: 16/649,988

(22) PCT Filed: Dec. 27, 2018

(86) PCT No.: PCT/JP2018/048146
§ 371 (c)(1),
(2) Date: Mar. 24, 2020

(87) PCT Pub. No.: WO2020/136804
PCT Pub. Date: Jul. 2, 2020

(65) Prior Publication Data
US 2021/0221499 A1    Jul. 22, 2021

(51) Int. Cl.
*B64U 101/60*    (2023.01)
*B64U 101/64*    (2023.01)
(Continued)

(52) U.S. Cl.
CPC .............. *B64C 39/024* (2013.01); *B64D 1/10* (2013.01); *B64D 1/14* (2013.01); *B64U 10/13* (2023.01);
(Continued)

(58) Field of Classification Search
CPC . B64C 2201/12; B64C 2201/128; B64D 1/10; B64D 1/12; B64D 1/22;
(Continued)

(56) References Cited

U.S. PATENT DOCUMENTS 11,554,856 B2 *   1/2023   Yamato .................... B64C 27/08
2014/0217230 A1 *  8/2014   Helou, Jr. ............. B64C 39/024
                                                   244/17.17
(Continued)

FOREIGN PATENT DOCUMENTS

CN   108528729 A    9/2018
CN   109229385 A *  1/2019
(Continued)

*Primary Examiner* — Christopher D Hutchens
*Assistant Examiner* — Michael A. Fabula
(74) *Attorney, Agent, or Firm* — Hea Law PLLC (57) ABSTRACT

An unmanned aerial vehicle, including: a propelling device configured to generate a downward airstream; a package carrier; and wheels arranged so as to allow the package carrier to stand alone. The package carrier includes: vertical members which surround a package in a horizontal direction to prevent falling of the package; support members configured to support a load of the package at positions; and a coupling device configured to hold vertical members so as to enable relative horizontal movement. The support members are each fixed to a corresponding one of the vertical members. The wheels are each mounted to the corresponding one of the vertical members, and enable the relative horizontal movement of the vertical members under a state in which the wheels are on the ground. Through the relative horizontal movement of the vertical members, the package is separable from the support members.

9 Claims, 8 Drawing Sheets

(51) Int. Cl.
*B64C 39/02* (2023.01)
*B64D 1/10* (2006.01)
*B64D 1/14* (2006.01)
B64U 10/13 (2023.01)
B64U 30/20 (2023.01)

(52) U.S. Cl.
CPC .......... *B64U 30/20* (2023.01); *B64U 2101/60* (2023.01); *B64U 2101/64* (2023.01)

(58) Field of Classification Search
CPC ............ B64U 2101/00; B64U 2101/60; B64U 2101/64; B64U 2101/66
See application file for complete search history.

(56) References Cited

U.S. PATENT DOCUMENTS

| | | | |
|---|---|---|---|
| 2017/0316701 A1* | 11/2017 | Gil | H04W 4/70 |
| 2019/0161190 A1* | 5/2019 | Gil | H04W 4/70 |
| 2021/0214075 A1* | 7/2021 | Yamato | B64U 10/13 |

FOREIGN PATENT DOCUMENTS

| | | | | |
|---|---|---|---|---|
| EP | 3702279 A1 * | 9/2020 | ............ | B64C 27/08 |
| JP | 2017196949 A | 11/2017 | | |
| JP | 2018122674 A | 8/2018 | | |
| JP | 6596617 B1 * | 10/2019 | ............ | B64C 27/08 |
| KR | 20170126127 A * | 11/2017 | | |
| KR | 101852844 B1 | 4/2018 | | |

\* cited by examiner

UNMANNED AERIAL VEHICLE WITH PACKAGE CARRIER

CROSS REFERENCE TO RELATED APPLICATIONS

This application is a National Stage of International Application No. PCT/JP2018/048146 filed on Dec. 27, 2018. The contents of the above document is incorporated herein by reference in its entirety.

TECHNICAL FIELD

The present invention relates to an unmanned aerial vehicle.

BACKGROUND ART

There has been known a drone including a landing device for landing, and there has also been considered a drone capable of accommodating the landing device during flying. Further, there has been known a drone including, at its lower portion, a holding mechanism capable of loading and dropping a package.

CITATION LIST

Patent Literature

[Patent Literature 1] JP 2018-122674 A
[Patent Literature 2] JP 2017-196949 A

SUMMARY OF INVENTION

Technical Problem

With regard to a drone including both the landing device and the holding mechanism, when the holding mechanism is of a movable type being adaptable to packages of various sizes and shapes, the landing device may be provided on an outer side of the holding mechanism so as to be adaptable to the packages of various sizes and shapes. However, such a configuration may cause increase in size of the drone.

The present invention has an object to be adaptable to packages of various sizes and shapes while suppressing increase in size.

Solution to Problem (1) According to one embodiment of the present invention, there is provided an unmanned aerial vehicle, including: a propelling device configured to generate a downward airstream; a package carrier; and a plurality of wheels arranged so as to allow the package carrier to stand alone. The package carrier includes: a plurality of vertical members which surround a package in a horizontal direction to prevent falling of the package; a plurality of support members configured to support a load of the package at a plurality of positions; and a coupling device configured to hold the plurality of vertical members so as to enable relative horizontal movement. The plurality of support members are each fixed to a corresponding one of the plurality of vertical members. The plurality of wheels are each mounted to the corresponding one of the plurality of vertical members, and enable the relative horizontal movement of the plurality of vertical members under a state in which the plurality of wheels are on the ground. Through the relative horizontal movement of the plurality of vertical members, the package is separable from the plurality of support members.

According to the present invention, the package carrier includes the vertical members which are horizontally movable so as to be adaptable to packages of various sizes and shapes. Further, the vertical members include wheels mounted thereto, and hence the increase in size is suppressed, and the vertical members are horizontally movable under a state in which the wheels are on the ground.

(2) In the unmanned aerial vehicle according to Item (1), the coupling device may be configured to support each of the plurality of vertical members so that each of the plurality of vertical members is movable only along a corresponding one direction, and the plurality of wheels may each be rotatable only along the direction in which the corresponding one of the plurality of vertical members is movable.

(3) In the unmanned aerial vehicle according to Item (2), the plurality of vertical members may be grouped into a plurality of different groups on a basis of the movable direction, and the plurality of wheels may be grouped into a plurality of different groups on a basis of the rotatable direction.

(4) In the unmanned aerial vehicle according to any one of Items (1) to (3), the plurality of vertical members may include a vertical member having none of the plurality of support members fixed thereto.

(5) In the unmanned aerial vehicle according to any one of Items (1) to (4), the plurality of vertical members may include a vertical member having none of the plurality of wheels mounted thereto.

(6) In the unmanned aerial vehicle according to any one of Items (1) to (3), the plurality of vertical members may include a vertical member configured to support no load, and the vertical member configured to support no load may be held by the coupling device so that the vertical member can be inclined toward an inner side of a space surrounded by the plurality of vertical members but is prevented from being inclined toward an outer side of the space.

(7) In the unmanned aerial vehicle according to any one of Items (1) to (6), two or more of the plurality of wheels may be mounted to the corresponding one of the plurality of vertical members.

(8) In the unmanned aerial vehicle according to any one of Items (1) to (7), the propelling device may include rotary wings.

(9) In the unmanned aerial vehicle according to any one of Items (1) to (8), the unmanned aerial vehicle may further include a damper interposed between each of the plurality of wheel and the corresponding one of the plurality of vertical members.

(10) In the unmanned aerial vehicle according to any one of Items (1) to (9), the coupling device may be an actuator configured allow relative horizontal movement of the plurality of vertical members.

(11) In the unmanned aerial vehicle according to any one of Items (1) to (10), the plurality of wheels may be arranged on an outer side of a region surrounded by the plurality of support members.

BRIEF DESCRIPTION OF DRAWINGS

FIG. 3(A) to FIG. 3(D) are views for illustrating an operation of loading.

DESCRIPTION OF EMBODIMENTS

Now, embodiments of the present invention are described with reference to the drawings. The present invention can be implemented by various modes without departing from the gist of the present invention, and is not to be construed as being limited to the contents of exemplary embodiments described below.

First Embodiment

Figure 1:
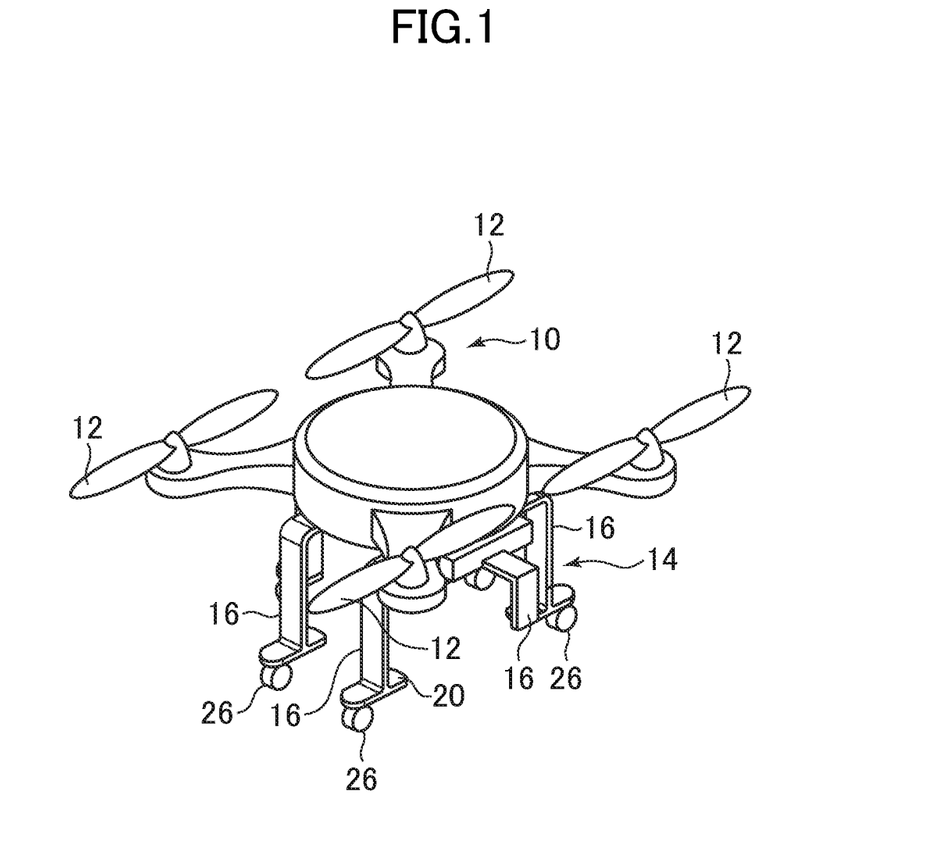
FIG. 1 is a perspective view for illustrating an unmanned aerial vehicle according to a first embodiment of the present invention.

FIG. 1 is a perspective view for illustrating an unmanned aerial vehicle according to a first embodiment of the present invention. The unmanned aerial vehicle is an aerial vehicle on which a person is not on board. For example, the unmanned aerial vehicle may be a drone driven by a battery or driven by an engine. The unmanned aerial vehicle includes a propelling device 10 configured to generate a downward airstream. The propelling device 10 includes rotary wings 12 (for example, propellers). The propelling device 10 includes a motor and a battery (not shown) configured to rotate the rotary wings 12. The unmanned aerial vehicle includes a control unit, a storage unit, a communication unit, and a sensor unit (not shown). The unmanned aerial vehicle includes a package carrier 14.

Figure 2:
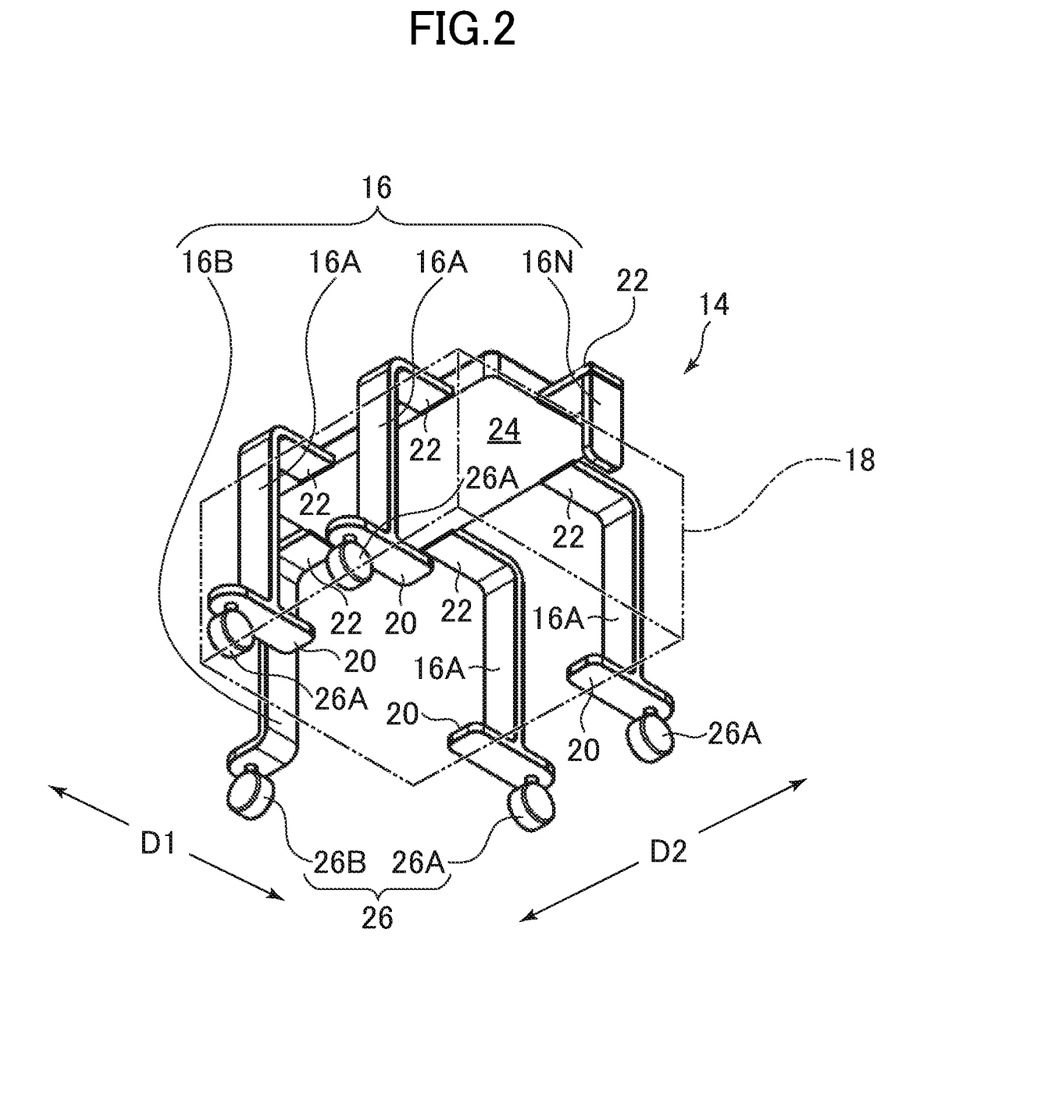
FIG. 2 is a perspective view for illustrating a package carrier.

FIG. 2 is a perspective view of the package carrier 14. The package carrier 14 includes a plurality of vertical members 16. The vertical members 16 extend in a perpendicular direction (vertical direction) under a state in which the unmanned aerial vehicle (package carrier 14) is landed. The plurality of vertical members 16 surround a package 18 in a horizontal direction so as to prevent falling of the package 18. That is, the package 18 is loaded in a space surrounded by the plurality of vertical members 16. For example, at least one pair (two pairs in the example of FIG. 2) of vertical members 16A are arranged apart from each other in a first direction D1, and at least one pair (one pair in the example of FIG. 2) of vertical members 16B and 16N are arranged apart from each other in a second direction D2 orthogonal to the first direction D1.

A load of the package 18 is supported at a plurality of positions by a plurality of support members 20 (for example, arms or claws). The plurality of support members 20 are each fixed to a corresponding one of the plurality of vertical members 16. For example, the support members 20 extend from the vertical members 16 (for example, at lower ends thereof) in a direction toward the space surrounded by the plurality of vertical members 16. A length of each of the support members 20 in the horizontal direction is shorter than a length of horizontal movement of each of the vertical members 16. One pair of support members 20 extending in a direction of opposing each other is fixed to one pair of opposing vertical members 16. The one pair of opposing support members 20 are apart from each other. A sum of lengths of the one pair of support members 20 in the horizontal direction is smaller than a distance of relative horizontal movement of the one pair of vertical members 16. The vertical members 16 having the support members 20 fixed thereto are configured to support the load of the package 18. For example, the support members 20 support only end portions of the package 18. Thus, through the horizontal movement of the vertical members 16 (separation of the opposing vertical members 16 from each other), the package 18 can be dropped off from the support members 20 (the package 18 supported by the support members 20 can be dropped). The plurality of vertical members 16 include the vertical members 16B and 16N which do not include the support members 20. The vertical members 16B and 16N do not support the load of the package 18.

The vertical members 16 are each connected to a slide rod 22 extending in the horizontal direction. The slide rod 22 is configured to slide along an extending direction thereof. With this, the vertical members 16 are horizontally movable so that the package carrier 14 is adaptable to packages 18 of various sizes and shapes.

The package carrier 14 includes a coupling device 24 configured to hold the plurality of vertical members 16. The slide rods 22 are directly held by the coupling device 24, and the vertical members 16 are held through intermediation of the slide rods 22. The coupling device 24 is configured to hold the plurality of vertical members 16 so as to enable relative horizontal movement. The relative horizontal movement is the horizontal movement of the plurality of vertical members 16. Horizontal movement of any one of the vertical members 16 is included in the relative horizontal movement even when any other vertical member 16 is stopped.

The coupling device 24 is configured to hold each of the plurality of vertical members 16 (directly hold each of the slide rods 22) so as to allow movement only along a corresponding one direction. The coupling device 24 is an actuator, and is configured to allow relative horizontal movement of the plurality of vertical members 16. The plurality of vertical members 16 are grouped into a plurality of different groups on a basis of a movable direction. For example, the plurality of vertical members 16 include the vertical members 16A configured to move only in the first direction D1 and the vertical members 16B and 16N configured to move only in the second direction D2.

A plurality of wheels 26 are mounted to the package carrier 14. The package carrier 14 stands alone with the plurality of wheels 26, and the unmanned aerial vehicle illustrated in FIG. 1 also stands alone. The plurality of wheels 26 are each mounted to a corresponding one of the plurality of vertical members 16. The vertical member 16B having the wheel 26 mounted thereto but having no support member 20 fixed thereto does not support the load of the package 18 but supports the load of the propelling device 10.

Under a state in which the plurality of wheels 26 are on the ground, the relative horizontal movement of the plurality of vertical members 16 can be performed. Thus, there is no need to provide an additional landing gear, thereby being capable of suppressing the increase in size.

The plurality of wheels 26 are each rotatable only along a direction in which a corresponding one of the plurality of vertical members 16 is movable. The plurality of wheels 26 are grouped into a plurality of different groups on a basis of a rotatable direction. For example, the wheels 26 include wheels 26A configured to rotate only in the first direction D1 and a wheel 26B configured to rotate only in the second direction D2. Thus, the plurality of wheels 26 are not rotatable when all of the plurality of wheels 26 are on the ground. With this, the package carrier 14 or the unmanned aerial vehicle does not move, thereby being capable of preventing movement caused by, for example, wind.

The plurality of vertical members 16 include the vertical member 16N which surrounds the package 18 in the horizontal direction to prevent falling of the package 18 but does not support any load. The vertical member 16N has no support member 20 fixed thereto and no wheel 26 mounted thereto. The vertical member 16N is held by the coupling device 24 so that the vertical member 16N can be inclined toward an inner side of the space surrounded by the plurality of vertical members 16 but is prevented from being inclined toward an outer side of the space. Such movement is enabled by a hinge 28, and is used at the time of loading.

Figure 3:
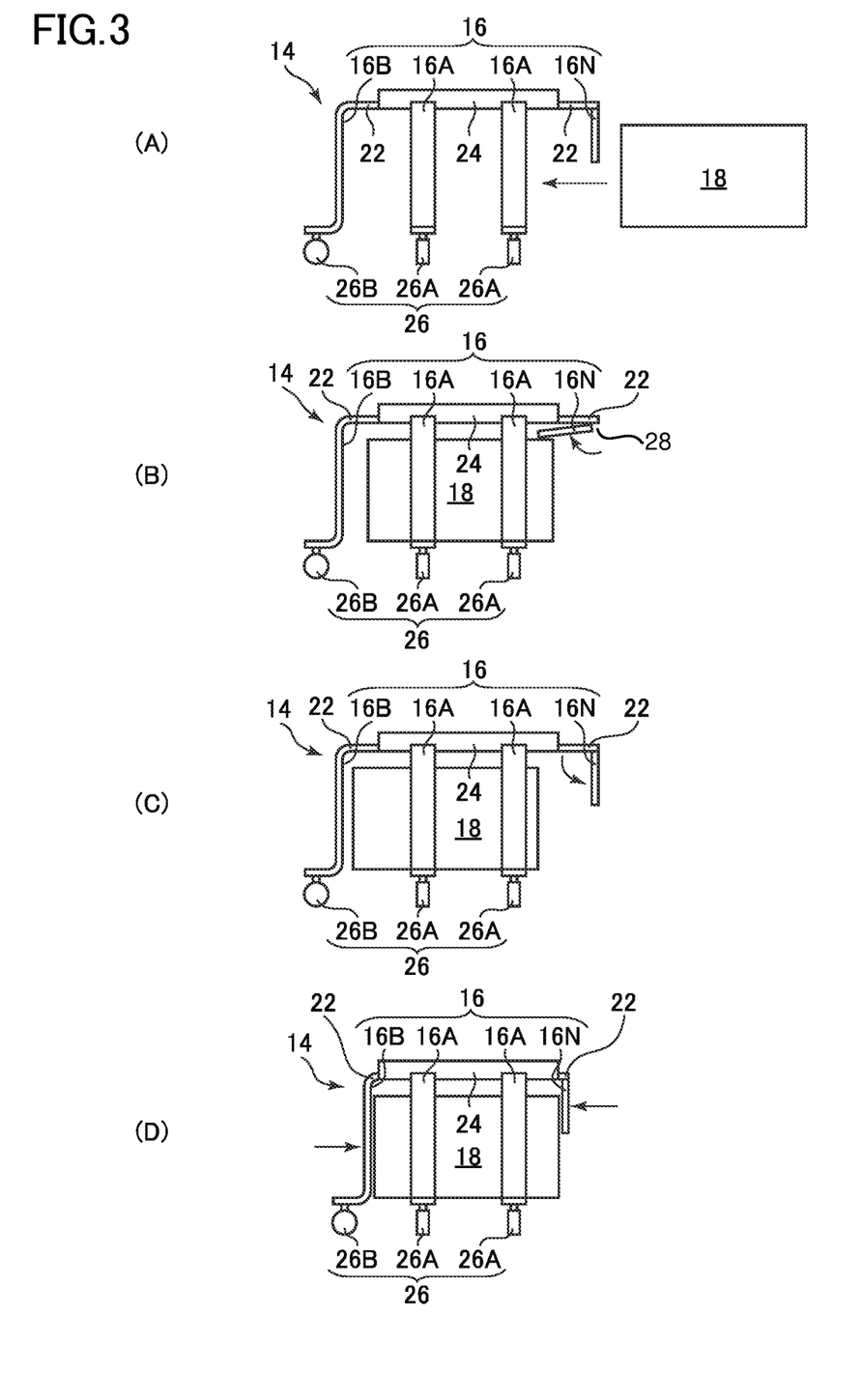

FIG. 3(A) to FIG. 3(D) are views for illustrating an operation of loading. As illustrated in FIG. 3(A), at the time of loading, the package 18 is conveyed toward the vertical member 16N. It is preferred that, at the time of loading, the space surrounded by the plurality of vertical members 16 be large. Therefore, the plurality of vertical members 16 are horizontally moved in the direction of separating away from each other (outward direction) in advance.

As illustrated in FIG. 3(B), while the vertical member 16N is inclined toward the inner side of the space surrounded by the plurality of vertical members 16, the package 18 is loaded. The load of the package 18 is supported by the plurality of support members 20.

As illustrated in FIG. 3(C), after the package 18 has been placed in the space surrounded by the plurality of vertical members 16, the vertical member 16N having been inclined returns to a position of extending in the perpendicular direction. This operation may be performed by the gravity or through use of an elastic member (spring or rubber) (not shown).

As illustrated in FIG. 3(D), the plurality of vertical members 16 are horizontally moved in a direction of approaching each other (inward direction). At this time, the vertical member 16N is not inclined toward the outer side. Therefore, similarly to other vertical members 16, falling of the package 18 can be prevented. Through the horizontal movement of the vertical members 16, the package carrier 14 is adaptable to packages 18 of various sizes and shapes. Then, after completion of the loading, the unmanned aerial vehicle takes off, flies, and lands at a destination.

Figure 4:
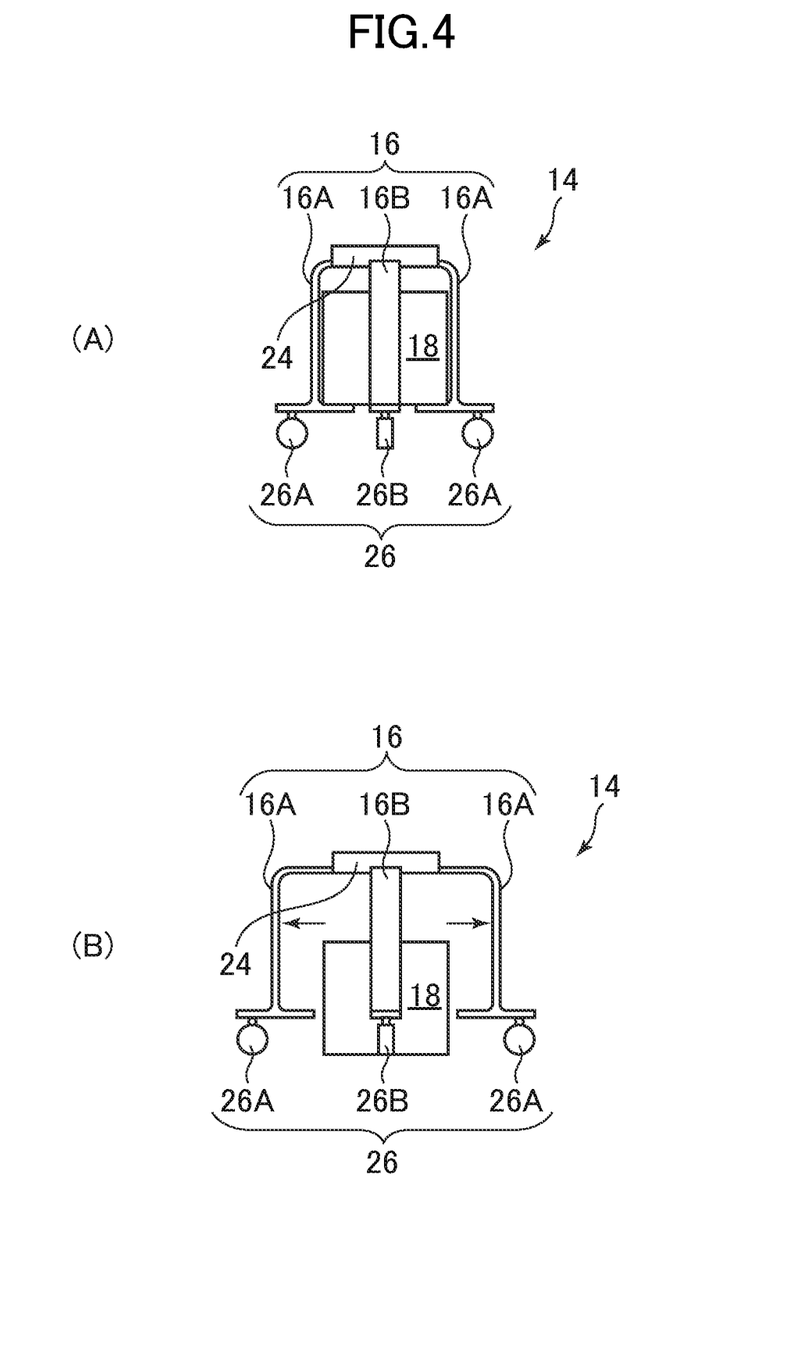
FIG. 4(A) to FIG. 4(B) are views for illustrating an operation of unloading.

FIG. 4(A) and FIG. 4(B) are views for illustrating an operation of unloading. At the time of landing, as illustrated in FIG. 4(A), the package 18 is surrounded by the plurality of vertical members 16 so that falling is prevented. Then, as illustrated in FIG. 4(B), the plurality of vertical members 16 are horizontally moved in the direction of separating away from each other (outward direction). The support members 20 supports only the end portions of the package 18. Therefore, through the relative horizontal movement of the plurality of vertical members 16, the package 18 is separated from the plurality of support members 20, and hence dropping of the package 18 can be performed.

Second Embodiment

Figure 5:
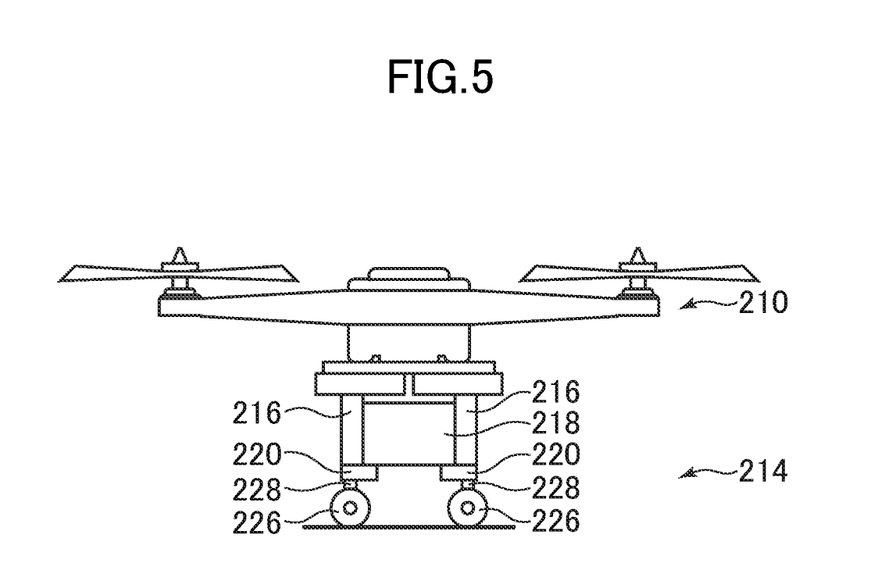
FIG. 5 is a side view for illustrating an unmanned aerial vehicle according to a second embodiment of the present invention.

FIG. 5 is a side view for illustrating an unmanned aerial vehicle according to a second embodiment. The unmanned aerial vehicle includes a propelling device 210, a package carrier 214, and a plurality of wheels 226. With regard to details of those components, the contents described in the first embodiment are applied. The package 218 is supported by a plurality of support members 220, and falling of the package 218 is prevented by a plurality of vertical members 216. Moreover, a damper 228 is interposed between each of the plurality of wheels 226 and a corresponding one of the plurality of vertical members 216. The dampers 228 absorb a shock at the time of landing of the unmanned aerial vehicle.

Figure 6:
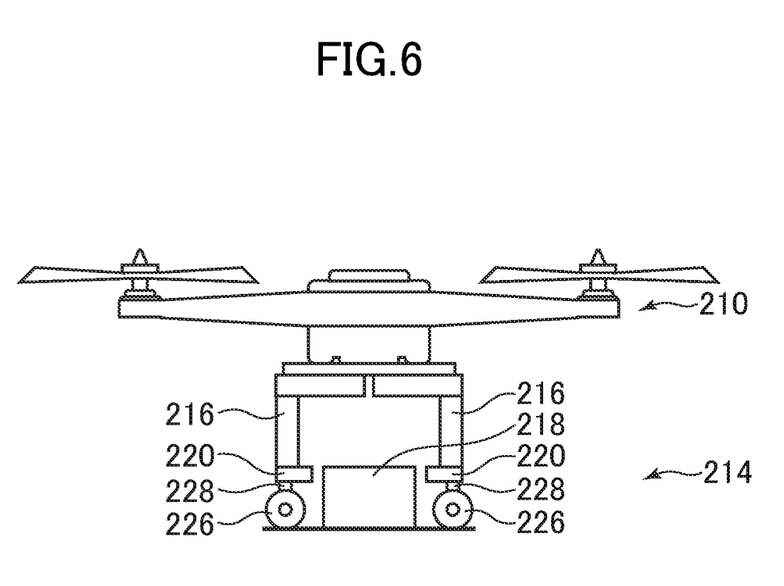
FIG. 6 is an explanatory view for illustrating unloading from the unmanned aerial vehicle illustrated in FIG. 5.

FIG. 6 is an explanatory view for illustrating unloading from the unmanned aerial vehicle illustrated in FIG. 5. Also in this embodiment, through the relative horizontal movement of the plurality of vertical members 216, the package 218 is separated from the plurality of support members 220, and dropping of the package 218 can be performed. Specifically, the contents described in the first embodiment are applied.

Third Embodiment

Figure 7:
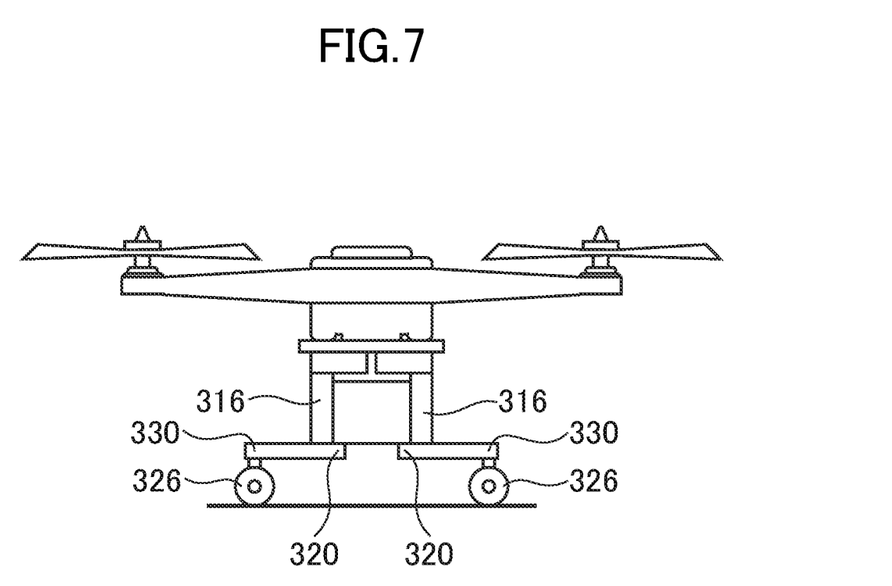
FIG. 7 is a side view for illustrating an unmanned aerial vehicle according to a third embodiment of the present invention.

FIG. 7 is a side view for illustrating an unmanned aerial vehicle according to a third embodiment of the present invention. In this embodiment, a plurality of wheels 326 are arrayed on an outer side of a region surrounded by a plurality of support members 320. Specifically, brackets 330 project in directions opposite to a direction in which the support members 320 project from the vertical members 316, and the wheels 326 are mounted to the brackets 330. With regard to other contents, the contents described in the second embodiment are applied.

Fourth Embodiment

Figure 8:
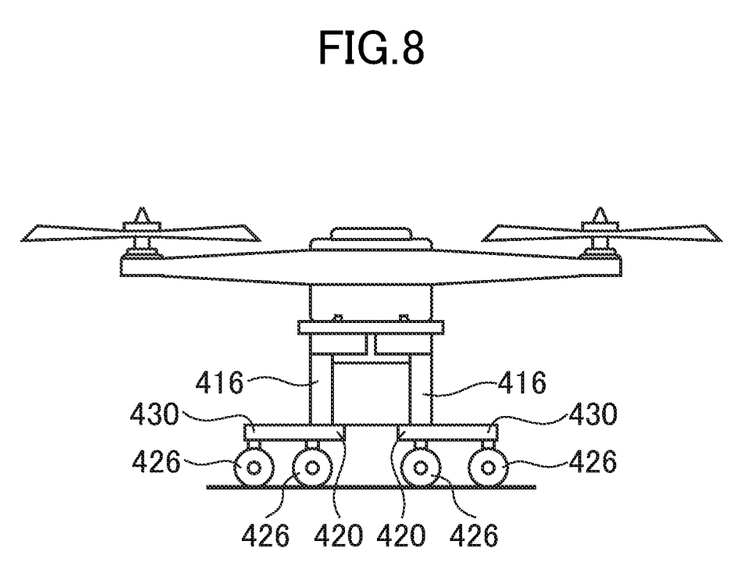
FIG. 8 is a side view for illustrating an unmanned aerial vehicle according to a fourth embodiment of the present invention.

FIG. 8 is a side view for illustrating an unmanned aerial vehicle according to a fourth embodiment of the present invention. In this embodiment, two or more of a plurality of wheels 426 are mounted to a corresponding one of a plurality of vertical members 416. Specifically, brackets 430 project in directions opposite to a direction in which the support members 420 project from the vertical members 416, and two or more of the wheels 426 are mounted to the brackets 430. With regard to other contents, the contents described in the second embodiment are applied.

The present invention is not limited to the embodiment described above, and various modifications may be made thereto. For example, the structure described in the embodiment may be replaced by substantially the same structure, a structure having the same action and effect, and a structure which may achieve the same object.

The invention claimed is:

1. An unmanned aerial vehicle, comprising:
   a propelling device;
   a package carrier; and
   a plurality of wheels configured to act as landing gear;
   wherein the package carrier includes:
      a plurality of vertical members which surround a package in a horizontal direction to retain the package relative to the unmanned aerial vehicle;
      a plurality of support members configured to support a load of the package at a plurality of positions; and
      an actuator configured to slidably couple the plurality of vertical members so as to enable relative horizontal movement so that each of the plurality of vertical members is movable only along a corresponding one direction, and
   wherein each of the plurality of wheels is rotatable only in the direction in which the corresponding one of the plurality of vertical members is movable;

wherein each of the plurality of support members is fixed to a corresponding one of the plurality of vertical members;

wherein each of the plurality of wheels is mounted to the corresponding one of the plurality of vertical members, and enable the relative horizontal movement of the plurality of vertical members under a state in which the plurality of wheels are on the ground; and wherein, through the relative horizontal movement of the plurality of vertical members, the package is separable from the plurality of support members.

2. The unmanned aerial vehicle according to claim 1, wherein the plurality of vertical members are grouped into a plurality of different groups on a basis of the direction for movement, and wherein the plurality of wheels are grouped into a plurality of different groups on a basis of the direction for rotation.

3. The unmanned aerial vehicle according to claim 1, wherein two or more of the plurality of wheels are mounted to the corresponding one of the plurality of vertical members.

4. The unmanned aerial vehicle according to claim 1, wherein the propelling device includes rotary wings.

5. The unmanned aerial vehicle according to claim 1, further comprising a damper interposed between each of the plurality of wheels and the corresponding one of the plurality of vertical members.

6. An unmanned aerial vehicle, comprising:
a propelling device;
a package carrier; and
a plurality of wheels configured to act as landing gear;
wherein the package carrier includes:
    a plurality of vertical members which surround a package in a horizontal direction to retain the package relative to the unmanned aerial vehicle;
    a plurality of support members configured to support a load of the package at a plurality of positions; and
    an actuator configured to slidably couple the plurality of vertical members so as to enable relative horizontal movement;
wherein each of the plurality of support members is fixed to a corresponding one of the plurality of vertical members;
wherein each of the plurality of wheels is mounted to the corresponding one of the plurality of vertical members, and enable the relative horizontal movement of the plurality of vertical members under a state in which the plurality of wheels are on the ground; and
wherein, through the relative horizontal movement of the plurality of vertical members, the package is separable from the plurality of support members, wherein the plurality of vertical members include a vertical member having none of the plurality of support members fixed thereto.

7. An unmanned aerial vehicle, comprising:
a propelling device;
a package carrier; and
a plurality of wheels configured to act as landing gear;
wherein the package carrier includes:
    a plurality of vertical members which surround a package in a horizontal direction to retain the package relative to the unmanned aerial vehicle;
    a plurality of support members configured to support a load of the package at a plurality of positions; and
    an actuator configured to slidably couple the plurality of vertical members so as to enable relative horizontal movement;
wherein each of the plurality of support members is fixed to a corresponding one of the plurality of vertical members;
wherein each of the plurality of wheels is mounted to the corresponding one of the plurality of vertical members, and enable the relative horizontal movement of the plurality of vertical members under a state in which the plurality of wheels are on the ground; and
wherein, through the relative horizontal movement of the plurality of vertical members, the package is separable from the plurality of support members, wherein the plurality of vertical members include a vertical member having none of the plurality of wheels mounted thereto.

8. An unmanned aerial vehicle, comprising:
a propelling device;
a package carrier; and
a plurality of wheels configured to act as landing gear;
wherein the package carrier includes:
    a plurality of vertical members which surround a package in a horizontal direction to retain the package relative to the unmanned aerial vehicle;
    a plurality of support members configured to support a load of the package at a plurality of positions; and
    an actuator configured to slidably couple the plurality of vertical members so as to enable relative horizontal movement;
wherein each of the plurality of support members is fixed to a corresponding one of the plurality of vertical members;
wherein each of the plurality of wheels is mounted to the corresponding one of the plurality of vertical members, and enable the relative horizontal movement of the plurality of vertical members under a state in which the plurality of wheels are on the ground; and
wherein, through the relative horizontal movement of the plurality of vertical members, the package is separable from the plurality of support members,
wherein the plurality of vertical members include a vertical member configured to support no load, and
wherein the vertical member configured to support no load is held by the actuator so that the vertical member can be inclined toward an inner side of a space surrounded by the plurality of vertical members but is prevented from being inclined toward an outer side of the space.

9. An unmanned aerial vehicle, comprising:
a propelling device;
a package carrier; and
a plurality of wheels configured to act as landing gear;
wherein the package carrier includes:
    a plurality of vertical members which surround a package in a horizontal direction to retain the package relative to the unmanned aerial vehicle;
    a plurality of support members configured to support a load of the package at a plurality of positions; and
    an actuator configured to slidably couple the plurality of vertical members so as to enable relative horizontal movement;
wherein each of the plurality of support members is fixed to a corresponding one of the plurality of vertical members;
wherein each of the plurality of wheels is mounted to the corresponding one of the plurality of vertical members, and enable the relative horizontal movement of the plurality of vertical members under a state in which the plurality of wheels are on the ground; and wherein, through the relative horizontal movement of the plurality of vertical members, the package is separable from the plurality of support members, wherein the plurality of wheels are arranged on an outer side of a region surrounded by the plurality of support members.

\* \* \* \* \*